Jan. 1, 1963 F. A. MILITANA 3,071,417
TRACTOR SHOE WITH REMOVABLE TRACTION BARS
Filed Sept. 18, 1961 2 Sheets-Sheet 1

INVENTOR.
FRANK A. MILITANA
BY
*Emery, Whittemore, Sandoe Graham*
ATTORNEYS

Jan. 1, 1963 F. A. MILITANA 3,071,417
TRACTOR SHOE WITH REMOVABLE TRACTION BARS
Filed Sept. 18, 1961 2 Sheets-Sheet 2
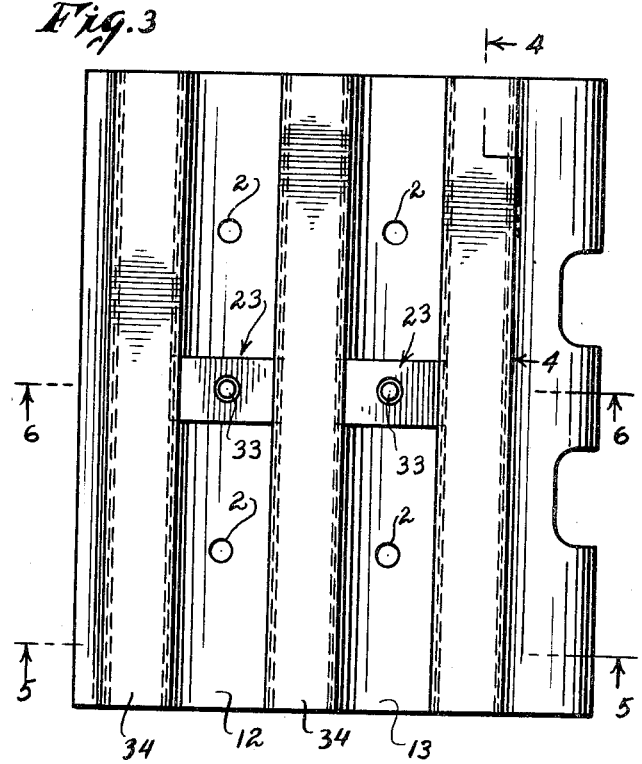
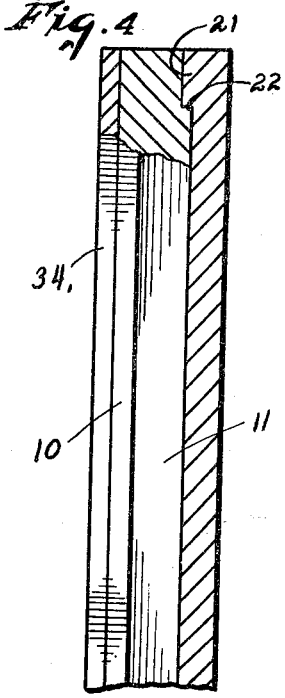
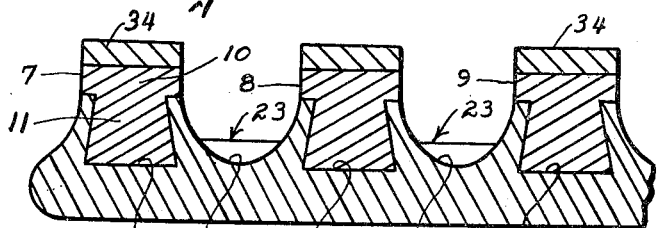
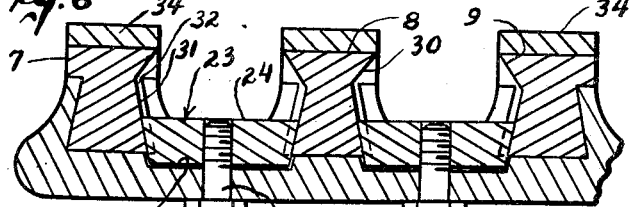
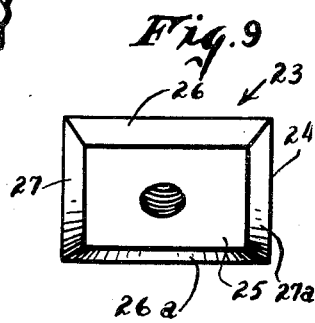
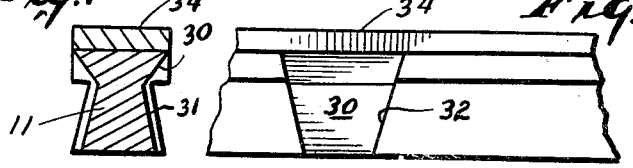
INVENTOR.
FRANK A. MILITANA
BY
ATTORNEYS 3,071,417
Patented Jan. 1, 1963

3,071,417
TRACTOR SHOE WITH REMOVABLE
TRACTION BARS
Frank A. Militana, 550 Monterey Ave.,
Pelham Manor, N.Y.
Filed Sept. 18, 1961, Ser. No. 138,898
12 Claims. (Cl. 305—54)

This invention relates to shoes for the endless tracks of track laying types of tractors sometimes known as crawler or endless chain or belt tractors. Such shoes are customarily attached to an endless chain or belt and are usually provided with transverse cleats, lugs or bars, sometimes known as grouser bars, which provide traction and prevent slipping when riding over soft or muddy ground. Such bars and the like are usually formed integrally with the shoe. As a result, when they become worn, it is necessary either to build up the worn parts by welding additional metal thereto, or to remove and replace the entire shoe. Frequently, if the wear is more or less uniform throughout the track, it is more convenient to remove and replace the entire track. Such repairs and replacements are expensive.

It is an object of the present invention to provide a shoe having removable traction bars which may be easily replaced when worn or damaged, or when it is desired to change from one type of bar to another to meet particular conditions of use.

Other objects and advantages of the invention will appear hereinafter.

Figure 1:
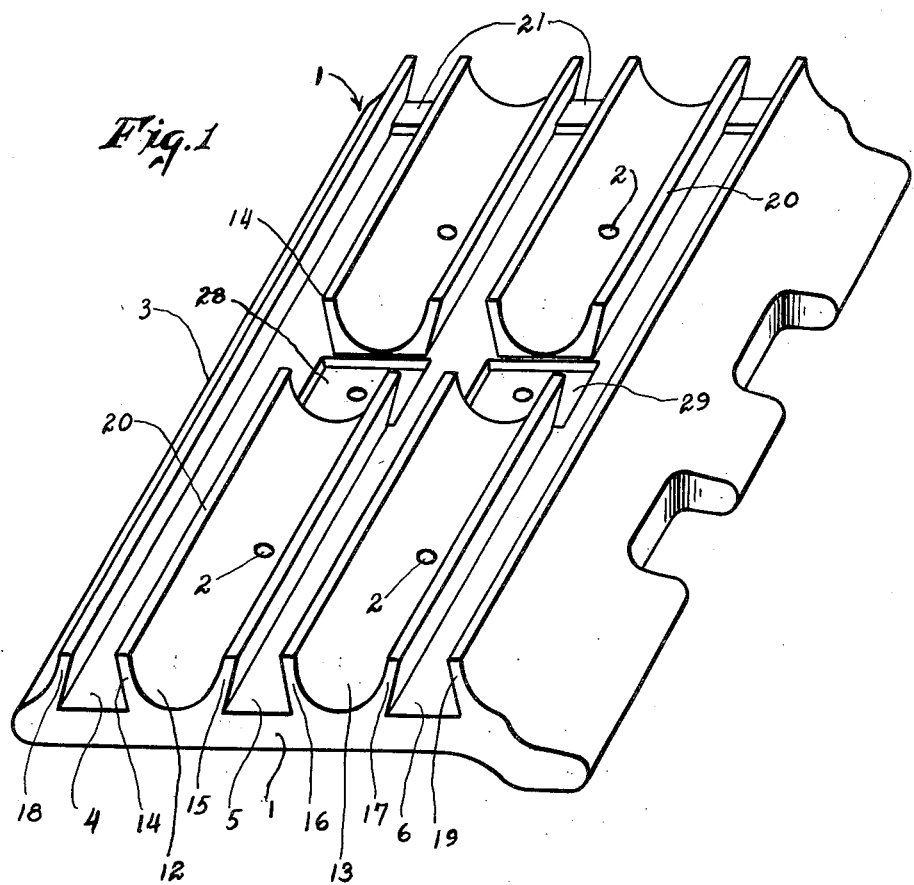
Figure 2:
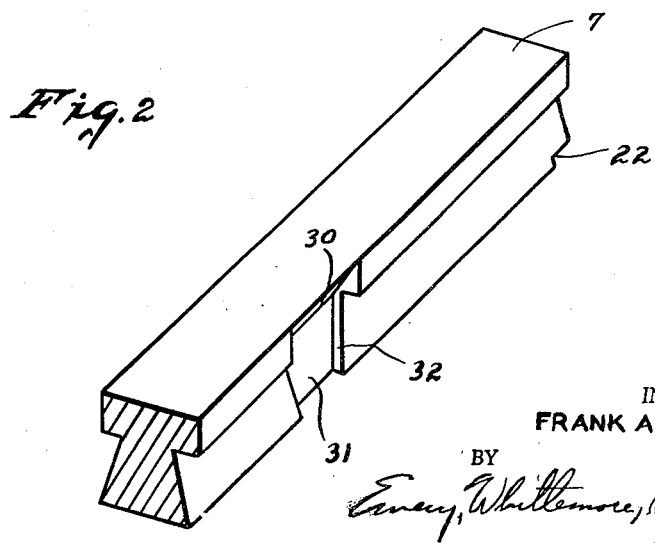

A preferred embodiment of the invention selected for purposes of illustration is shown in the accompanying drawings, in which, FIGURE 1 is a perspective view of a tractor shoe.
FIGURE 2 is a perspective view of a traction bar.
FIGURE 3 is a plan view of the tractor shoe with the traction bars in place.
FIGURE 4 is a section on the line 4—4 of FIGURE 3.
FIGURE 5 is a section on the line 5—5 of FIGURE 3.
FIGURE 6 is a section on the line 6—6 of FIGURE 3.
FIGURE 7 is a section on the line 7—7 of FIGURE 2.
FIGURE 8 is a fragmentary side elevation of the midportion of a traction bar.
FIGURE 9 is a perspective view of a locking plate.

This application is filed as a continuation-in-part of my copending application Serial No. 89,260, filed February 14, 1961, now abandoned.

Referring to the drawings, the tractor shoe 1 is of conventional contour and may be provided with any suitable means for attachment to an endless chain or belt, as for example, by providing bolt holes 2 therein.

The ground engaging face 3 of the shoe is provided with a plurality of transverse grooves to receive replaceable traction bars. In the preferred embodiment illustrated, three such grooves 4, 5 and 6 are provided, and each groove is preferably of dovetail shape in cross-section.

The traction bars 7, 8 and 9 are T-shaped in cross-section, each having a traction head 10 which is substantially rectangular in cross-section and a base 11 which is of dovetail shape in cross-section to fit snugly in one of the grooves 4, 5 or 6. Preferably the spaces between adjacent grooves are recessed to form the transverse channels 12, 13 of semi-circular cross-section, the spacing being such as to provide walls 14, 15, 16 and 17 of substantial strength between the grooves and channels for the support of the traction bars. Similar walls 18 and 19 assist in the support of the outside bars 7 and 9. Each of said walls terminates in a flat surface 20 which lies beneath and supports the side arm of the head of one of the bars.

Preferably, one end of each of the grooves 4, 5 and 6 is provided with a step abutment 21, and one end of each of the bars 7, 8 and 9 is provided with a recess 22 to receive the abutment 21 when the bar is slid into place. The abutment thus serves as a limit stop to aid in properly locating the bar when it is inserted in the shoe.

In order to lock the bars 7, 8 and 9 in position and to hold them against displacement in use, locking plates 23 are provided. Said locking plates have parallel rectangular top and bottom faces 24 and 25, but their side faces 26, 26a and end faces 27, 27a are beveled for reasons hereinafter set forth.

Referring to FIGURE 1 it will be noted that each of the walls 14, 15, 16 and 17 is cut away near its midpoint, in order to permit insertion of the locking plates. Moreover the face of the shoe is provided with recesses 28 and 29 to receive the locking plates. Finally, the side walls of the base 11 of the bars are provided with notches 30 to receive an end of a locking plate. Each of the said notches is provided with beveled surfaces 31, 32 adapted to be engaged by the beveled surfaces 26, 26a, 27 and 27a of the side and end faces of the locking plates 23.

Thus, for example, in assembling a shoe for use, the bars 7, 8 and 9 would first be inserted in the grooves 4, 5 and 6 and pushed home until seated against the respective abutments 21. One of the locking plates 23 is then placed between the bars 7 and 8 with its ends entering the notches 30 of these bars, the locking plate being tilted as it is inserted to permit the edges of the plate to clear the edges of the bars. A bolt 33 is then passed through the shoe and is threaded into the locking plate. As the bolt is tightened, drawing the locking plate into the recess 28, the beveled end faces 27, 27a of the locking plate engage the opposed beveled surfaces 31 of the notches 30 of the bars 7 and 8 and exert a wedging action on the bars to lock the bars against sidewise motion in the grooves. At the same time, the beveled side faces 26, 26a of the locking plate engage the opposed beveled surfaces of the notches 32 of the bars 7 and 8 and exert a wedging action on the bars to lock the bars against endwise motion in the grooves.

A second locking plate 23 is then placed between the bars 8 and 9 with its ends entering the notches 30 of these bars, and is tightened by a bolt 33 as before described. Thus, two locking plates serve to hold the three replaceable bars in position. The wedging forces exerted by the beveled side and end surfaces of the locking plates against the beveled surfaces of the notches of the bars lock the bars tightly against movement in any direction. Yet when the locking plates are removed by loosening the bolts 33, the bars may be easily removed from the grooves.

The heads of the bars may be of uniform composition throughout if desired, but preferably are provided with a tread 34 of hard, wear resistant metal.

It will be understood that the invention may be variously modified and embodied within the scope of the subjoined claims.

I claim as my invention:

1. A tractor shoe having a ground engaging surface having a transverse groove therein, a removable bar in said groove, and a locking plate mounted on the ground engaging surface of said shoe, said locking plate having a beveled surface engaging a side surface of said bar, and means for tightening said locking plate on said shoe to cause said beveled surface to exert a wedging action on said bar to hold said bar firmly in said groove.

2. A tractor shoe as claimed in claim 1 in which said bar is provided with a notch having at least one beveled surface opposed to and engaged by said beveled surface of said locking plate.

3. A tractor shoe as claimed in claim 1 in which the said beveled surface of said locking plate is an end surface and in which said locking plate is provided with two additional beveled side surfaces, and in which said bar is provided with a notch having three beveled surfaces opposed to and engaged by said beveled end and side surfaces of said locking plate.

4. A tractor shoe as claimed in claim 1 in which said groove is open at one end and terminates in an abutment at its other end which serves as a limit stop for endwise movement of said bar.

5. A tractor shoe as claimed in claim 1 in which said bar is substantially T-shaped in cross-section and has a head and a base, in which said groove is of dovetail shape in cross-section, and in which the base of said bar is of dovetail shape in cross-section.

6. A tractor shoe as claimed in claim 1 in which said shoe is provided with a recess below said locking plate.

7. A tractor shoe having a plurality of transverse grooves therein, a removable bar in each of said grooves, said bars being substantially T-shaped in cross-section and having a head and a base, said shoe having a plurality of transverse channels alternating with said transverse grooves, said grooves and channels being spaced to provide walls therebetween terminating in flat end surfaces, the bases of said bars being received in said grooves with the heads of said bars engaging and supported by said flat end surfaces of said walls.

8. A tractor shoe as claimed in claim 7 in which said grooves are of dovetail shape in cross-section and the bases of said bars are of dovetail shape in cross-section.

9. A tractor shoe having a ground engaging surface having a plurality of spaced parallel transverse grooves therein, a removable bar in each of said grooves, and a locking plate mounted on the ground engaging surface of said shoe between adjacent grooves, said plate spanning the space between two of said grooves and having beveled surfaces engaging the said bars in said grooves and means for tightening said locking plate on said shoe to cause said beveled surface to exert a wedging action on both of said bars in opposite directions to hold said bars firmly in said grooves.

10. A tractor shoe as claimed in claim 9 in which said shoe has a plurality of transverse channels alternating with said transverse grooves, said grooves and channels being spaced to provide walls therebetween terminating in flat end surfaces.

11. A tractor shoe as claimed in claim 10 in which said shoe is provided with a recess spanning each of said channels below said locking plates.

12. A tractor shoe having a ground engaging surface having a pair of upstanding, transversely extending walls projecting outwardly from said surface and terminating in flat end surfaces, said walls being spaced to form a groove therebetween, a removable bar in said groove, said bar being substantially T-shaped in cross-section and having a head and a base, the base of said bar being received in said groove with the head of said bar engaging and supported by said flat end surfaces of said wall.

References Cited in the file of this patent
UNITED STATES PATENTS

| | | |
|---|---|---|
| 627,274 | Selleck | June 20, 1899 |
| 813,571 | McDonald | Feb. 27, 1906 |
| 1,629,519 | Messner | May 24, 1927 |
| 2,050,936 | Ebing | Aug. 11, 1936 |
| 2,064,890 | Dorst | Dec. 22, 1936 |
| 2,563,848 | Knox | Aug. 14, 1951 |